3,427,783
BISCUIT CUTTING AND PACKING APPARATUS
Francis R. Reid, Minneapolis, Minn., assignor to The Pillsbury Company, Minneapolis, Minn., a corporation of Delaware
Filed Sept. 27, 1966, Ser. No. 582,298
U.S. Cl. 53—123
Int. Cl. B65b 25/16, 63/00
10 Claims The present invention relates to cutting and packing devices for dough pieces used for preparing biscuits, rolls and the like. More particularly the invention relates to an apparatus for cutting dough pieces from a dough sheet at relatively high speed and for transferring them from the cutting means to a shipping container positioned beneath the cutting means. For convenience, the dough pieces will be referred to simply as "biscuits." It should be understood, however, that they are uncooked when cut and packed.

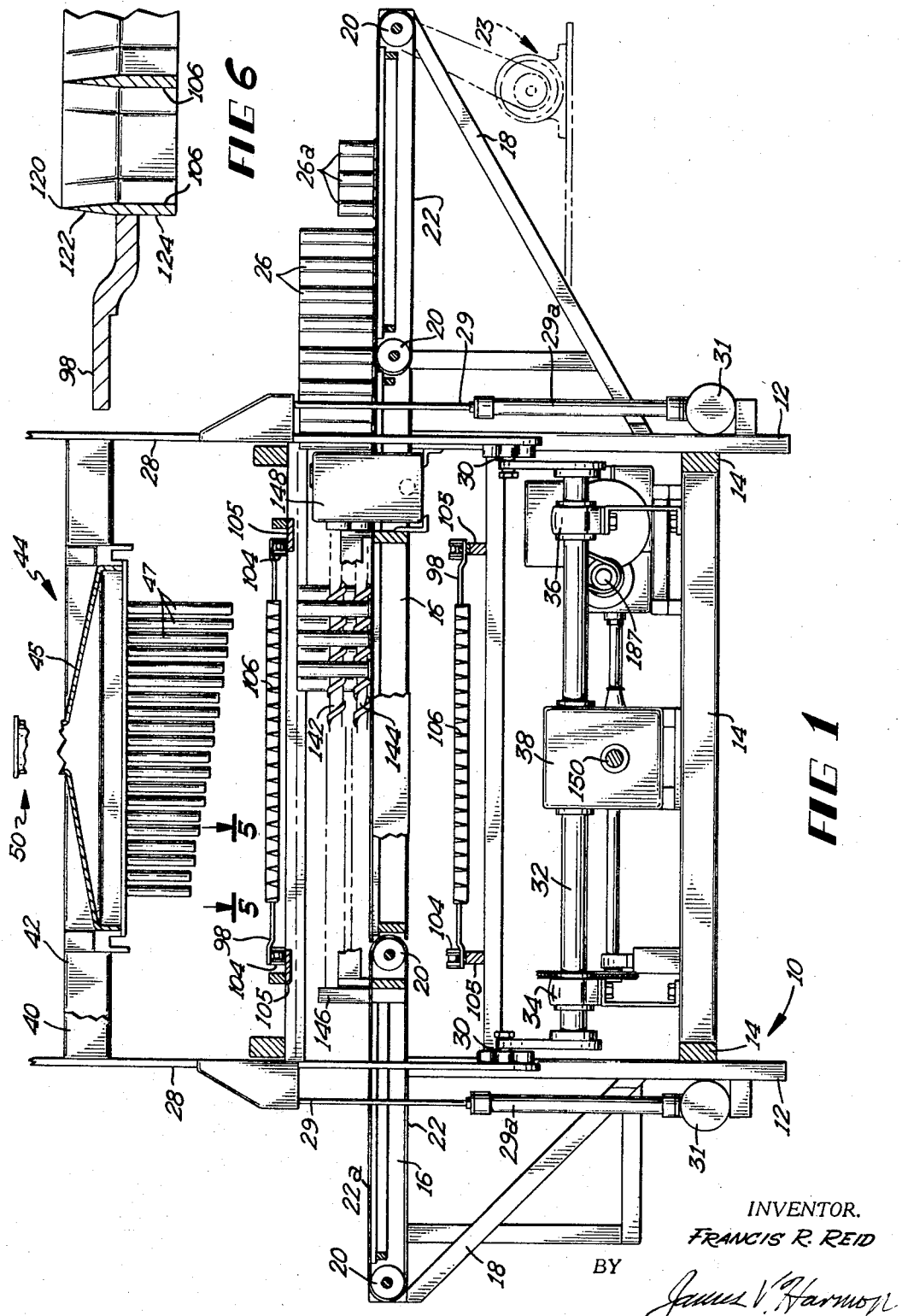

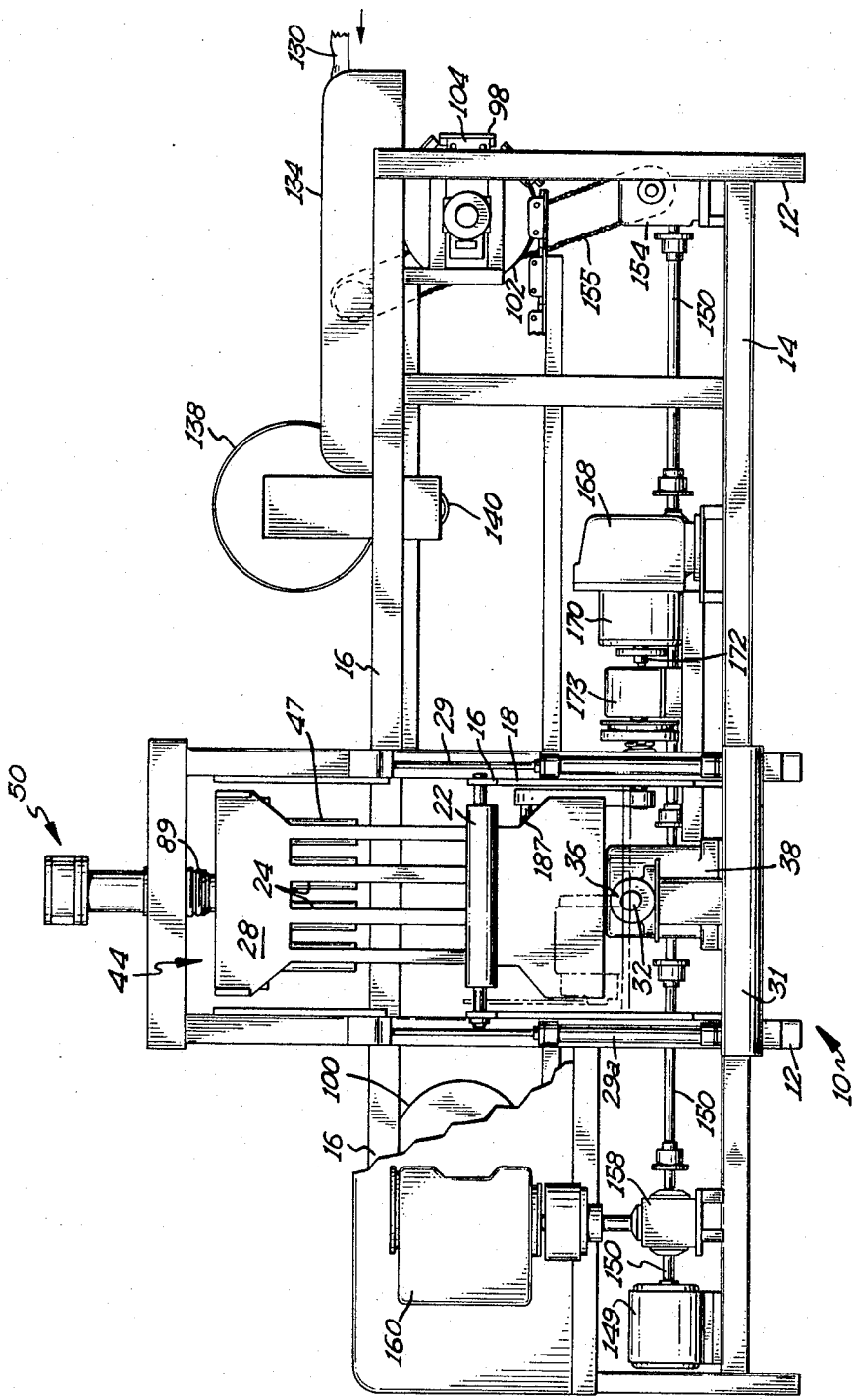

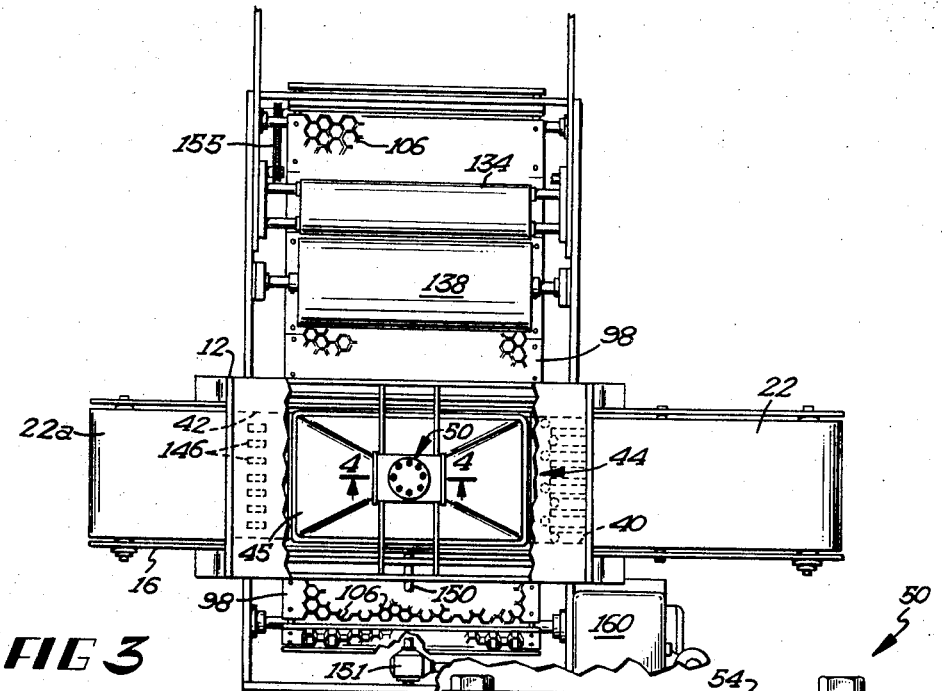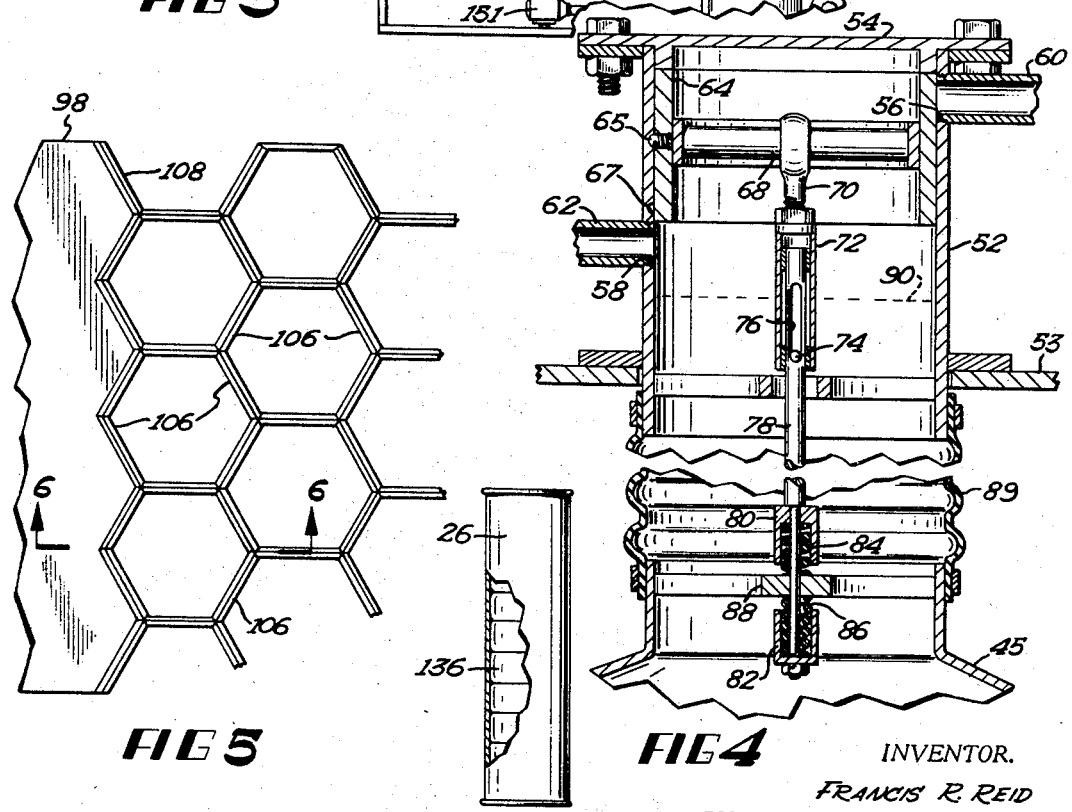

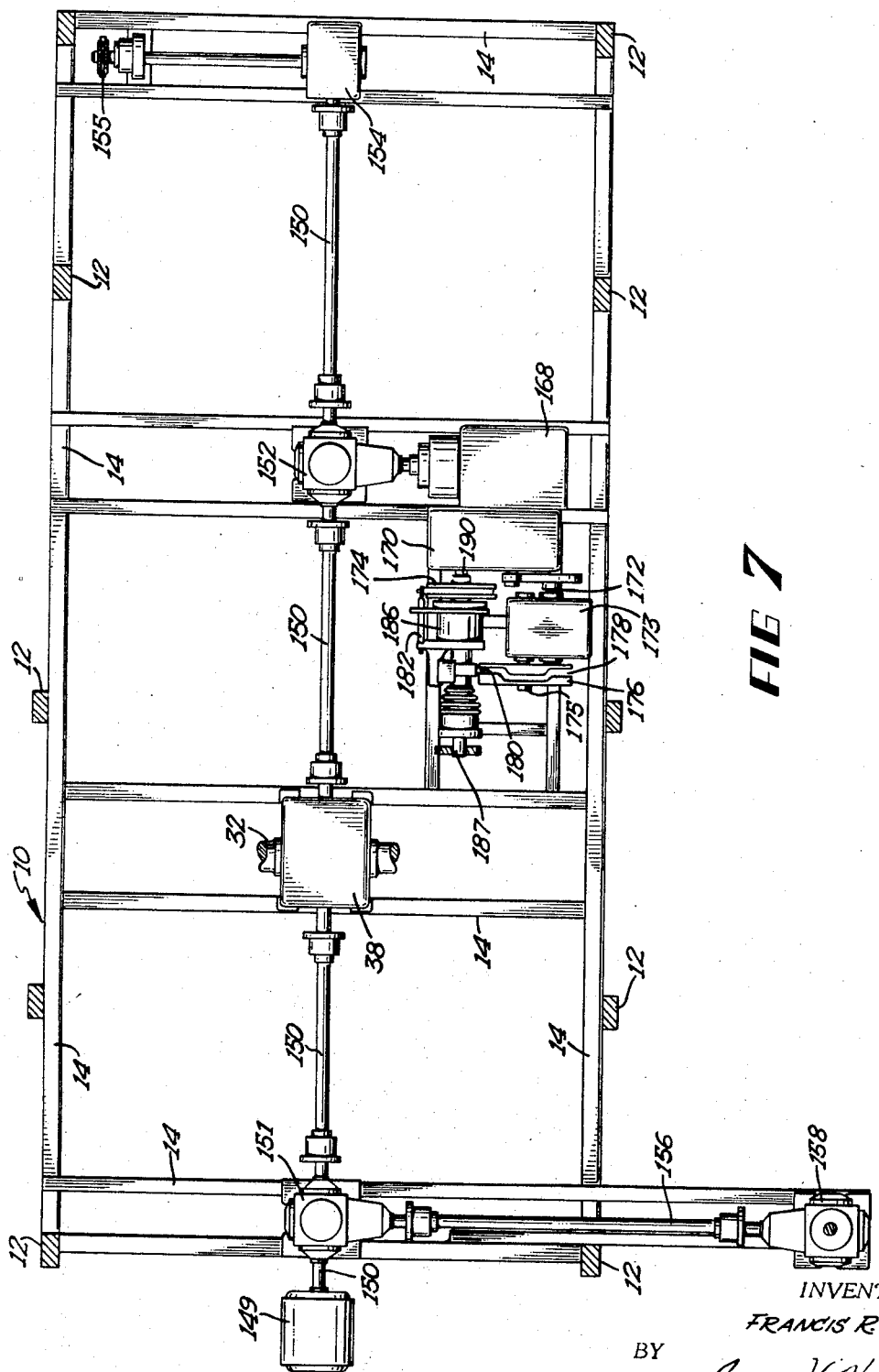

A great many problems are encountered in reliably cutting biscuits from a body of dough and packing them in shipping containers. This is particularly true at relatively high packing speeds. Among the problems encountered is the formation of scrap or trimmings in the dough sheet as the biscuits are cut from the sheet. Thus when dough is cut by means of circular cutting rings of the type shown in Patent No. 2,664,833, the dough trimmings which remain between the rings must be separately handled and returned for reprocessing. To overcome this problem, I have proposed providing cutter units each composed of a grid-work defining a plurality of hexagonal dough receiving openings. In this equipment a new problem is presented. Since the dough pieces are removed from the openings at different times, it is not possible to depend upon uncut connecting structures between adjacent biscuits for retaining the biscuits in the openings as described in the above noted patent. Accordingly, there is a tendency for the dough to fall through the openings inadvertently other than at the proper time, particularly since the machinery is operating at relatively high speed and the dough is being advanced intermittently with acceleration and deceleration of the cutting unit tending to release the dough pieces once they are cut. Furthermore, although some of the dough pieces are removed immediately from the cutter unit, others must be retained in their openings through several cycles and it is during this period of time that the dough pieces are particularly likely to become dislodged from the opening. Thus, in prior hexagonal type cutting and packing machines the biscuits were held securedly within the openings by the provision of a ledge at the bottom of each opening and were transferred upwardly and packed into cans positioned above the cutter all as described in my prior Patent No. 3,154,986. This ledge is relatively thick being about four times the thickness of the wall of the opening.

While machines of this type are extremely successful for most applications, in certain situations they are not entirely suitable. For example, the speed of operation may be limited or there may be a tendency to damage the dough pieces themselves as they are being cut and packed. This is particularly objectionable when it occurs since the damage done at this stage of the packing operation can result in a malformation of the biscuits after they are baked. Moreover, the fingers employed for holding the biscuits in the can as they are filled are susceptible to being broken or lost.

The primary objects of the present invention are to provide an improved biscuit cutting apparatus of the type described in which the biscuits can be cut from a sheet of dough without leaving a substantial quantity of trimmings which must be separately handled and recycled to the feed end of the machine; wherein fingers or other supports are not required for retaining the dough within the cans; wherein the apparatus is well suited for high-speed operation for substantial periods of time and is useful both in packing small or large cans as may be desired and has little tendency to deform the dough pieces as they are being cut and packed.

Briefly, in accordance with the present invention, there is provided a dough cutting and packing machine which includes a cutting unit having a plurality of openings therein to define a grid work. The openings have straight side walls and are preferably hexagonal in cross section. A movable member such as a roll or the like is provided for pressing the dough sheet into the openings. A compressing means is provided for confining the dough as it is pressed into the openings whereby the dough will become frictionally engaged upon the walls of the openings and a gas operated retaining and propelling means is operatively associated with the compression means as the biscuits are removed from the openings.

In accordance with a preferred form of the invention, the compressing means comprises the provision of a tapered wall portion in each of the openings with the lower edge of the walls having a greater thickness than the upper edge so that the dough as it is pressed downwardly into the opening is compressed centrally by a predetermined amount and is held therein by a combined frictional force and the mechanical engagement with the wall resulting from its being tapered so as to be somewhat thicker at the bottom than at the top.

The piece retaining and releasing means comprise tubes or heads mounted for reciprocation through the openings and a valve for supplying gas and pressure or vacuum to the lower ends thereof. In accordance with the present invention, I have discovered that the combined action of the compression means within the openings and the dough retaining and releasing heads are highly effective in controlling the position and motion of the dough pieces and causing them to be released and allowed to fall at the precise moment through the cutter bars into the containers positioned beneath the cutter bars without either damage to the biscuits or loss resulting from their having fallen prematurely from the openings. I have found that the piece retaining and releasing heads are particularly effective if gas pressure is regulated close to the heads themselves so that the pressure of the gas is almost immediately effective in either retaining the pieces in their predetermined fixed position or for releasing them in order that they will be allowed to transfer quickly into the cans in which they are packed.

The invention will be better understood by reference to the more detailed and specific description of the invention and to the accompanying drawings wherein:

FIGURE 1 is a side elevational view of the invention partly broken away.

FIGURE 2 is a side elevational view taken on line 2—2 of FIGURE 1.

FIGURE 3 is a plan view of the invention on a somewhat reduced scale.

FIGURE 4 is a partial vertical sectional view taken on line 4—4 of FIGURE 3.

FIGURE 5 is a partial plan view of the cutting unit on an enlarged scale.

FIGURE 6 is a partial vertical sectional view taken on line 6—6 of FIGURE 1.

FIGURE 7 is a plan view of the drive arrangement and transmissions employed.

FIGURE 8 is a side elevational view partly broken away of a can that has been packed with biscuits in accordance with the invention.

As seen particularly in FIGURES 1, 2 and 3 there is provided a supporting framework 10 composed of columns 12 and a plurality of cross members 14 rigidly supported parallel rails 16 at their upward ends. The free ends of the rails 16 are supported by means of diagonal braces 18 (FIGURE 1). Mounted between the rails 16 are four laterally extending horizontally disposed rollers 20 over which are entrained two endless belt conveyors 22 and 22a suitably driven as by a motor 23 for supporting a plurality of cans 26 which during operation pass from right to left as seen in FIGURE 1 through openings 24 (FIGURE 2) within a pair of laterally spaced vertically disposed end plates 28 which are themselves mounted for reciprocation along a vertical axis and each is pivotally connected at their lower ends to one throw 30 of a crank 32 which is journalled for rotation within bearings 34 and 36. Suitably secured to the plates 28 are rods 29 having plungers at their lower ends mounted for sliding movement within cylinders 29a. The lower end of each cylinder 29a is coupled to a compressed air storage tank 31 which provides air under sufficient pressure to just lift the plates 28 so as to reduce the load placed upon the drive motors and crank 32 as will be described hereinbelow. The crank 32 is connected to a gear reducer 38 or the like which is driven during operation at a uniform velocity so as to impart reciprocation to the plates 28.

Connected between the upper ends of the support plates 28 are a pair of cross members 40 and 42. Between these members is mounted a gas operated retaining and releasing assembly 44 which is used for controlling the positioning and placement of the biscuits supported within the cutter unit. The assembly 44 includes a hollow manifold 45 which communicates with a plurality of vertically disposed positioning tubes or heads 47 rigidly connected to the lower end of the manifold 45.

The tubes 47 are open at both ends. As clearly seen in FIGURE 1, the tubes 47 are of graduated lengths so that the lower ends are spaced from the cutter assembly by the greatest distance at the left end thereof as seen in FIGURE 1 and by the least distance at the right end thereof as seen in the figure.

The gas control valve assembly used for operating the positioning tubes 47 will now be described in connection with FIGURE 4. The valve mechanism indicated generally at 50 consists of a vertically disposed tube 52 closed at its upper end by means of a plate 54 which can be bolted or otherwise secured thereon. The tube 52 is mounted upon a fixed support 53 suitably rigidly affixed to the framework of the apparatus. Connected between the tube 52 and the housing 45 is a flexible tube 89 formed from rubber or similar material. Tube 52 is provided with a pair of longitudinally spaced openings 56 and 58 to which is secured an air pressure supply duct 60 and a vacuum supply duct 62 respectively. Within the tube 52 is a movable valve member such as a cylindrical sleeve or valve member 64. Diametrically mounted in the sleeve 64 is a pin 68 to which a link 70 is pivotally connected. Attached to the lower end of the link 70 is a tube 72. A pin 74 is rigidly secured to the tube and extends through a slot 76 within a connecting rod 78. At the lower end of rod 78 are two collars 80 and 82. Between the collars are mounted a pair of springs 84 and 86 which abut a cross member 88 for resiliently supporting the rod 78 upon the manifold housing 45. A detent assembly 65 is provided in the wall of the sleeve 64 for releasably retaining the sleeve in one of two selected positions. It will be seen that when the sleeve 64 is raised to the position shown in FIGURE 4, it will seal the opening 56. When the sleeve 64 is moved downwardly so that its lower edge is located along the dotted line designated 90, it will be retained in a lower position with a detent assembly 65 in the recess 67 and the sleeve 64 sealing the opening 58.

The operation of the valve mechanism 50 will now be described. It will be assumed that the sleeve 64 is in the position shown with the vacuum line and is connected through the tube 89 to the manifold housing 45. As the housing 45 approaches its lowermost position, the cross member 88 acting through springs 84 and 86 will lower the rod 78 until the upper end of the slot 76 contacts the pin 74. The pin 74 and tube 72 will then be lowered thereby lowering the sleeve 64 so that its lower edge reaches the dotted line position 90. When this position is reached, the line 62 will be sealed and the air under pressure will be admitted through the line 60 and opening 56 into the housing 45. The air pressure within the manifold 45 will then rapidly increase and air will be expelled through the lower ends of the tubes 47.

During operation the sleeve 64 is raised, the pressure will be reduced within the manifold housing 45 and accordingly when the dough pieces are contacted by the lower ends of the tubes 47 their centers will be drawn upwardly to a slight degree. I have discovered that this will reliably retain the dough pieces in position on the lower ends of the tubes and will prevent excessive deformation as the biscuits are drawn out of their confined positions within the openings. When the valve member 64 approaches its lowermost position, the air pressure applied through line 60 will pass into the housing 45 causing air to be expelled through the lower ends of the tubes 47. Thus, when the lower ends of the tubes are brought into the cans, the dough pieces will be quickly released from the tubes at the proper position in the can by the action of the gas being expelled from the lower ends of the tubes 47.

The cutting unit will now be described with particular reference to FIGURES 3, 5 and 6. As is clearly shown in the figures, the cutting unit comprises an endless chain entrained over a pair of horizontally disposed longitudinally spaced sprockets 100 and 102 as can be seen best in FIGURE 2. The plates 98 are connected at their side edges to sprocket chain 104, only a part of which is shown in FIGURE 2. Each of the plates 98 is provided with a plurality of vertical openings having side edges formed from plates to define straight side edges with a thickness of only a single plate 106 between adjacent openings. Some of the openings in the plate 98, as at 108, are positioned with the edge of the plate 98 to define only one half of a complete opening, the other half of which is defined by an aligned opening in the adjacent plate 98. Adjacent plates thereby define a continuous cutting surface. During operation, the rolls 100 and 102 and the chains 104 and plates 98 are all moved intermittently by means of an intermittent drive assembly 160 (FIGURE 2). As shown in FIGURE 1, the chains 104 slide over rails 105.

Refer now to FIGURE 6. The walls 106 of the openings within the plate 98 have a sharpened upward edge 120, a compression section 122 tapered outwardly proceeding toward the center of the plates 106 and a lower section 124 having a constant thickness. In one machine, the thickness of the wall section 124 was about ⅛ inch. The openings in the cutter unit were about 1¾ inches across the hexagon. In this manner the pieces were compressed radially inwardly to about 15/16 of their initial width as they were pressed downwardly into the openings in the plate 98 between the walls 106 to the point where the walls have a constant thickness at 124. I have found that if the dough pieces are compressed by too great an amount, they will be irreversably deformed. If, on the other hand, they are compressed insufficiently they will have a tendency to fall out through the bottom of the openings during the rapid acceleration and deceleration of the cutting unit.

In FIGURE 2 and 3 it will be seen that as the sheet of dough 130 enters the machine, it passes into a compensating means 134 of any conventional and well known construction such as that shown in my prior Patents Nos. 3,120,198 and 3,148,635 which are incorporated herein by reference. The sheet emerges and is pressed into the openings within the plates 98 by a horizontally disposed and transversely extending roll 138 positioned above the cutter unit. Beneath the cutter unit 98 is a supporting roll indicated at 140. It should be understood that the cut pieces of dough will fill each of the openings within the plate 98 and will be reliably retained within the openings by the compression as described hereinabove. When the dough pieces within the plates 98 pass between the cans 26 that are to be filled and the positioning heads 47 the reciprocal movement of the heads will transfer the cut pieces downwardly into the cans with the dough pieces being retained on the heads by the vacuum exerted on the heads during downward movement.

The cans are properly positioned for receiving the cut pieces by the provision of a plurality of pairs of laterally extending horizontally disposed upper and lower flighted augers 142 and 144, only one pair being shown in FIGURE 1. The left end of each pair of augers 142 and 144 is journalled for rotation within a supporting plate 146. The right end of each pair is mounted within a drive assembly 148, only one of which is shown. In operation, it will be understood that the cans will pass between each of the drive assemblies 148. The tubes 47 at the right as seen in FIGURE 1 extend furthest into the cans. The dough pieces are thus placed closer to the bottom at the right as the cans enter and closer to the top of each can as each is filled. As the assembly 44 makes each stroke, the cans are advanced to the next opening to receive each successive dough piece as it is expelled.

The mechanism employed for driving the various parts of the apparatus in accordance with the invention will now be described. An electric drive motor 149 has connected to it a drive shaft 150 (FIGURES 1, 2 and 7) which extends through a right angle gear box 151 to the gear reducer 38 and to gear boxes 152 and 154. From box 154 a chain 155 extends vertically to the compensating means 134. A shaft 156 as seen in FIGURE 7 extends from gear box 151 to a box 158. From box 158 a shaft extends vertically to an intermittent drive 170 which operates the cutting unit 98. Power is transmitted from box 152 to a box 168, from there to intermittent drive 170 and to a manually operated speed changer 173. The intermittent drive 170 is coupled to a dog clutch 174 by means of shaft 190. The intermittent drive mechanism 170 can comprise any of various known drives such as a Geneva drive. The output shaft 175 of speed changer 173 is connected to a cam 176 having a groove 178 within which is mounted a cam follower 180 connected by means of a fork 182 to the dog clutch 174. The clutch 174 in turn connects shaft 190 to a shaft 187 which is coupled to the gear box 148 (FIGURE 1). During operation, when the clutch 174 is engaged, the shaft 187 will turn with the intermittently operated shaft 190. When shaft 175 and cam 176 are turning, at certain times when the shaft 190 is indexed, the clutch 186 will be disengaged and the shaft 187 will not turn. In this manner, the can indexing gear box 148 can be made to remain stationary while the cutter unit advances one or more times. The cans will consequently be filled with different quantities of cut pieces depending upon the particular filling requirements and can sizes. I refer to this operation as "skip indexing." In this manner in accordance with the present invention, it is possible to quickly change from the relatively large cans 26 to much smaller cans such as those designated 26a (FIGURE 1).

In practice, the clutch 174 can, for example, be opened on each second index of the shaft 190. Under these conditions, the cans will remain in a fixed position since the augers 142 and 144 will not turn when the cutting unit 98 is advanced and the positioning heads 44 undergo two complete cycles. As a result, two blanks of dough will be inserted into the can at each location. As the machine continues to operate, the clutch 174 will then be engaged and the cans will advance to their next station as the augers 142 and 144 turn. Again the clutch 174 will be disengaged while the cutter unit 98 is advanced and the positioning heads 44 undergo two more downward strokes thereby forcing two slugs of dough into each can with the can in the same position. Thus, with the clutch 174 engaged and disengaged upon alternate indexes of shaft 190, the cans 26 will be packed with greater number as for example 12 biscuits. The speed changer 173 is preferably provided with several output speeds such as 1:1, 2:1 and 3:1.

I have discovered that for best operation, the cutter blades should have a surface which will easily release the cut dough. I have not obtained the best results with highly polished smooth finishes but rather with the finish known to those skilled in the art as a satin finish as produced, for example, with a vapor blast.

In accordance with the present invention, the problems encountered with the handling and recycling of scrap dough remaining between the cutters has been eliminated and at the same time problems encountered in transferring dough upwardly from the cutters into cans positioned above the cutters including the problems of dough deformation and breakage of parts has been eliminated. Moreover, in the case of many of the prior devices the last dough piece at the end of the cutter bar is unsupported since the other dough pieces have been removed. According to the present invention, the compression provided by the side walls of the cutting openings acting with the retaining and propelling means on the tubes 47 serves very effectively for initially holding the dough within the openings of the cutter bars 98 as they move to position where the cans are to receive the dough pieces, then transferring the dough pieces from their confined and compressed positions without permanent deformation and quickly placing them in the can. Thus, as the biscuits are engaged by the tubes 47, the vacuum supplied to the heads will reliably secure the end of each cut piece to the lower end of the tube and thereby help to prevent the dough piece from being deformed due to the frictional engagement between the side edges of the dough piece and the tapered walls of the cutter. When the vacuum is not employed in accordance with the invention, frictional engagement between the dough pieces and the walls will tend to draw the side edges of each of the dough pieces upwardly as the center portion of each dough piece is pressed downwardly by the positioning head. Accordingly, it is the cooperation between the suction supplied to the positioning head as the head moves downwardly through the opening and the cutter bar cooperating with the tapered walls of the cutter unit which permits the dough pieces to be reliably retained in the cutter bar and subsequently removed by the positioning head without excessive deformation.

Moreover, the present invention is distinguished from packers of the type in which dough is transferred upwardly into cans positioned above the cutter bars by the elimination of supports used for holding the biscuits in the cans. In the present invention, it is possible to strike each piece of dough and press it into the can. It is therefore fairly easy to make sure that the cans are well packed and tightly compressed. The auger conveyor of the type employed herein has been found highly effective in advancing the cans at high speed and it will be seen that since the cans are engaged both at two vertically spaced points so that it is impossible for the cans to be accidentally tipped over as they can be at relatively high speeds if only the bottom of each can is engaged by the conveying mechanism. Accordingly, the invention is more reliable in operation and the conveyor is able to handle large and small cans equally well.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A dough cutting and packing apparatus for dividing a dough strip into a plurality of pieces and for packing the pieces into a container, said apparatus comprising:

(a) a cutter unit having a plurality of adjacent openings therein to define a grid work with the openings having straight side edges and abutting against one another, (b) each of the side edges of the openings comprising a substantially vertically disposed plate, each of said adjacent openings having a single plate between them, (c) a movable member provided for pressing the dough strip into the openings with the upward edge of each of the side walls being adapted to thereby cut the strip into a plurality of said pieces as the strip is pressed therewithin, (d) a means on the cutter unit for compressing each dough piece radially inwardly as it is pressed downwardly into the openings and for frictionally engaging the sides of the pieces as they travel downwardly into the openings, (e) gas operated retaining and releasing heads mounted above the cutter unit for reciprocation through the cutter unit and adapted to retain the dough pieces in a predetermined position on the lower end of each head during a portion of their downward travel and for releasing the cut pieces of dough away from the lower ends of the positioning heads as the heads reach a predetermined lower position whereby the dough pieces are removed from their confined positions in the cutter unit without substantial permanent deformation and then released into said containers, (f) a container positioning means provided below the cutter unit for supporting the containers in a predetermined position below the cutter unit and for advancing the containers from one opening of the cutter unit to the next to receive said pieces as they are expelled from successive openings to thereby fill each of said containers with a plurality of said cut pieces.

2. The apparatus of claim 1 wherein said compression means comprises a cutter bar composed of a plurality of vertically disposed intersecting walls, said walls having relatively sharp upward edges, a tapered section including surfaces inclined outwardly proceeding toward the lower end of the bar to about the center thereof and a section of constant thickness extending from about the center of the bar to the lower surface thereof, and the thickness of the lower edge of each said plate being sufficient to compress each dough piece to about $15/16$ of its original average width.

3. The combination of claim 1 wherein the cutter comprises a plurality of substantially flat intersecting walls with adjacent cutter openings therein separated only by a single one of said walls, said openings having a hexagonal configuration whereby no excess dough remains when the strip is pressed into the openings and whereby said cut dough pieces are substantially hexagonal in cross section.

4. The apparatus of claim 1 wherein the dough pieces are compressed to about $15/16$ of their original average diameter.

5. The apparatus according to claim 1 wherein the cutter unit comprises an endless chain formed from a plurality of horizontally disposed parallel articulated bars positioned adjacent one another and adapted to form a continuous cutting surface and wherein said movable member comprises a roller adapted to press the dough sheet into said continuous cutting surface.

6. The apparatus according to claim 5 wherein said continuous cutting surface is connected to form an endless chain entrained over a pair of longitudinally spaced horizontally disposed rolls and an intermittent drive means is connected to the rolls for intermittently advancing the chain at timed intervals.

7. The apparatus according to claim 1 wherein said container feeding comprises a horizontally disposed longitudinally extending flighted auger conveyor and wherein an intermittent drive means is operatively associated with each of the said screw augers for rotating said augers at timed intervals for advancing the containers from a position aligned with one opening in the cutter bar to another at timed intervals and drive means for synchronizing the movement of the containers with the movement of the cutter bar.

8. The apparatus according to claim 7 wherein said container feeding means comprises a pair of said augers mounted vertically of one another and connected together for engaging each receptacle at two vertically spaced positions thereon and preventing the receptacles from being tipped over as they are advanced.

9. The apparatus according to claim 1 including a provision for pressing a greater number of pieces of dough into a container than there are openings on a straight line extending across said cutter bar in the direction of movement of the can comprising a means for advancing the cutter bars without advancing said containers whereby the downward movement of the positioning and retaining means will transfer a plurality of pieces of dough from the cutter bar to each receptacle with each receptacle in fixed position thereby filling the receptacle with more than one dough piece with said container in said fixed position.

10. The apparatus according to claim 1 including a source of gas under pressure, a source of vacuum, a manifold connected to each of said retaining and releasing means and a selector valve mounted upon the manifold including a movable valve member secured to the manifold for normally connecting the interior of the manifold to the vacuum and for connecting the manifold to a source of gas under pressure when the manifold has reached a predetermined lower position for expelling said gas from the heads to release the biscuits into said containers.

References Cited

UNITED STATES PATENTS

| 2,664,833 | 1/1954 | Armstrong et al. | 53—123 |
| 3,154,986 | 11/1964 | Reid | 53—123 X |
| 3,273,300 | 9/1966 | Watrous et al. | 53—23 |

TRAVIS S. McGEHEE, *Primary Examiner.*

ROBERT L. FARRIS, *Assistant Examiner.*

U.S. Cl. X.R.

53—240